United States Patent [19]

Wendler

[11] Patent Number: 4,827,661
[45] Date of Patent: May 9, 1989

[54] FISH STRINGER

[76] Inventor: Glenn H. Wendler, P.O. Box 170-Hwy. 6E, South Amana, Iowa 52334-0170

[21] Appl. No.: 188,443

[22] Filed: Apr. 29, 1988

[51] Int. Cl.$^4$ ............................................. A01K 91/06
[52] U.S. Cl. ....................................... 43/55; 43/44.98; 24/128; 224/103
[58] Field of Search ................. 43/55, 44.98; 224/103, 224/920, 0.5, 42.45 R; 24/128 R, 115 R, 116 A, 122.6, 143 R; 248/205.3

[56] References Cited

U.S. PATENT DOCUMENTS

| | | |
|---|---|---|
| 878,626 | 2/1908 | Guilford . |
| 879,591 | 2/1908 | Roussel ............................ 24/128 R |
| 2,141,801 | 12/1938 | Taft ................................. 24/143 R |
| 2,440,012 | 4/1948 | Haver .............................. 24/128 R |
| 2,442,472 | 6/1948 | Sagan .................................. 224/103 |
| 2,453,381 | 11/1948 | Orton . |
| 2,470,941 | 5/1949 | Orton . |
| 2,483,072 | 9/1949 | Stonich . |
| 2,564,389 | 8/1951 | Boehm et al. . |
| 2,588,768 | 3/1952 | Rosenberg ............................. 43/55 |
| 2,724,881 | 11/1955 | DiMaria ........................ 24/128 R |
| 2,765,998 | 10/1956 | Engert ............................ 248/205.3 |
| 3,052,002 | 9/1962 | Lesher . |
| 3,160,336 | 12/1964 | Flatford et al. . |
| 3,808,725 | 5/1974 | Matsumoto ....................... 43/44.98 |
| 3,854,638 | 12/1974 | Anderson . |
| 4,308,643 | 1/1982 | Montplaisir . |
| 4,550,938 | 11/1985 | Nakanishi ......................... 43/44.98 |

Primary Examiner—Nicholas P. Godici
Assistant Examiner—Michael William Starkweather
Attorney, Agent, or Firm—Hill, Van Santen, Steadman & Simpson

[57] ABSTRACT

A fish stringer and bracket assembly wherein the stringer has a loop on the end upon which a first fish may be mounted and the stringer also has one or more enlarged diameter portions such that the enlarged diameter portion of the stringer can be received in a bracket which will not allow the enlarged portion to pass through so as to lock the stringer to a boat or other device. The one end of the stringer has a pointed metal spike attached which makes easy to pass the stringer through the gills of a fish. The bracket may be attached to a boat or other device with the screws or, alternatively, may be attached to the boat with a peel-off double-sided adhesive or other form of an adhesive. The stringer may be quickly and easily removed from the bracket when in use.

3 Claims, 1 Drawing Sheet

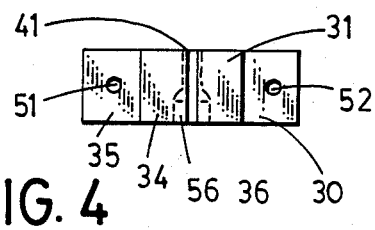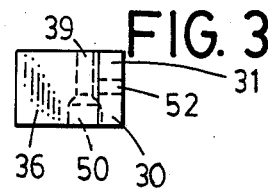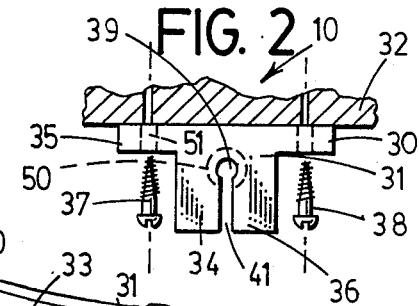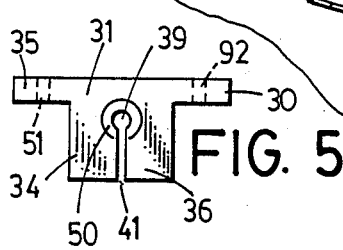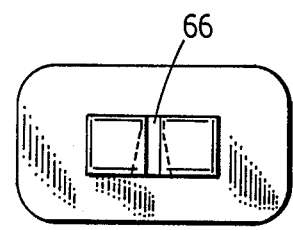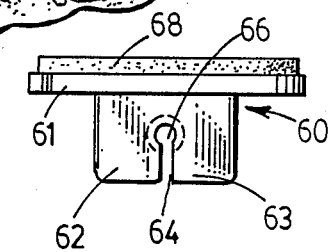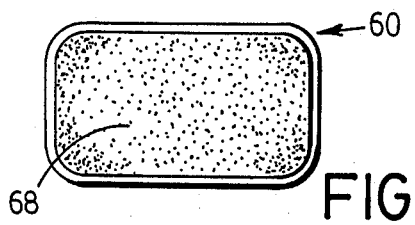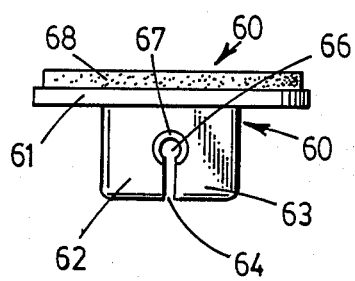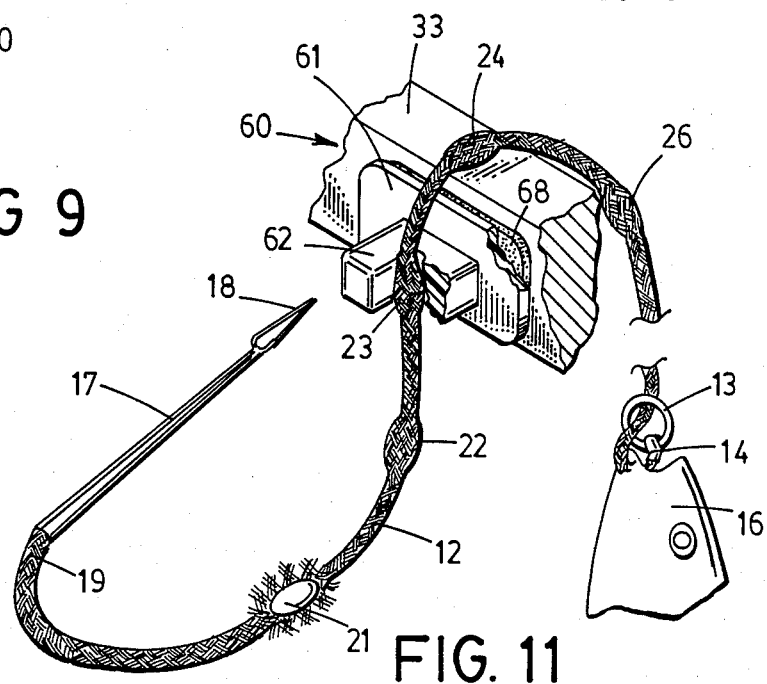

FISH STRINGER

BACKGROUND OF THE INVENTION

1. Field of the Invention

This invention relates in general to an improved fish stringer and in particular to a novel fish stringer that can be easily removed from a bracket.

2. Description of the Prior Art

The following U.S. Patents disclose various fish stringers. U.S. Pat. No. 878,626, 2,470,941, 2,483,072, 2,453,381, 2,564,389, 3,052,002, 3,160,336, 3,854,638 and 4,308,643.

SUMMARY OF THE INVENTION

The present invention provides a fish stringer which is formed with a sharp metal spike on one end and a loop on the other end and in which a stringer is made of hollow line such as plastic line and wherein one or more diameter increaser means are inserted into the hollow core of the line. The insert may be tapered at both ends so as to reduce the effort required to slip the enlarged portion of the line through the fish's lips. A bracket is attached to the boat which has a slot and socket into which the fish stringer can be received and locks the stringer so that it cannot be pulled by the fish down through the bracket.

In use, the tapered spike may be passed through the fish's gills and mouth and then the stringer can be removed from the bracket so that the fish will slide down to the end of the stringer and rest against the other fish. Then the stringer is replaced in the bracket with the enlarged portion locking the stringer to the bracket. The first fish, of course, is attached to the stringer by looping the stringer through a loop provided on the end of the stringer for that purpose.

Other objects, features and advantages of the invention will become apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a partial sectional view illustrating the stringer of the invention mounted on a boat;

FIG. 2 is a top view of a first form of the bracket attached to the boat;

FIG. 3 is a side view of the bracket of FIG. 2;

FIG. 4 is a front view of the bracket of FIG. 2;

FIG. 5 is a bottom view of the bracket of FIG. 2;

FIG. 6 illustrates a modified form of the bracket in a top view;

FIG. 7 is a side view of the bracket of FIG. 6;

FIG. 8 is a front view of the bracket of FIG. 6;

FIG. 9 is a back view of the bracket of FIG. 6;

FIG. 10 is a bottom view of the bracket of FIG. 6; and

FIG. 11 is an enlarged partially cut-away view illustrating the stringer in use.

DESCRIPTION OF THE PREFERRED EMBODIMENTS

FIG. 1 illustrates a portion of a boat 10 which has an upper rail 33 to which the stringer 11 of the invention is attached. As shown in FIGS. 1-5 and 11 a stringer line 12 is made of circular woven material and has a first end 14 which is connected to a ring 13. The other end 19 has a metal portion 17 which is formed with a sharp point 18 as shown. Mounted within the flexible stringer 12 are one or more inserts 21 shown in cut-away in FIG. 11, for example. The insert 21 may be made of plastic or metal or other suitable material and is mounted in the hollow line 12 by inserting it into the line before the ring 13 or the members 17 are attached. Since the line 12 is a hollow plastic line or other suitable material, it can be increased in diameter so as to allow the insert 21 to be moved along the line by compressing the line end-wise After the insert 21 has been placed at the correct or desired position, it can be locked in place relative to the line by pulling on the line to tighten it upon the insert 21 to hold it in the desired position. As shown in FIG. 11, more than one insert can be mounted in the line 12 and in FIG. 11, five inserts 21, 22, 23, 24 and 26 are shown mounted in the line 12. As an alternative method of inserting the inserts such as 21 into the line, the hollow line 12 can be compressed longitudinally and opened so as to allow the insert 21 to be inserted after which the line is pulled to lock the insert in place.

In use, when the first fish 16 is caught as illustrated in FIG. 11, the point 18 of the metal end 17 is inserted through the mouth and gill of the fish and then passed through the loop 13 and the line 12 is then locked to the boat by passing the line 12 through the bracket such as bracket 31 illustrated in FIGS. 1-5 or the modified bracket 60 as illustrated in FIGS. 6-10. The bracket of the first embodiment illustrated in FIGS. 1-5 is formed with two extending portions 10 and 35 as shown for example, in FIGS. 2, 4 and 5 which are formed with openings 51 and 52, respectively, through which screws 37 and 38 can be passed to attach the bracket 31 to the railing 33 of the boat as illustrated, for example, in FIG. 2. The bracket also has extending portions 34 and 36 which extend away from the railing 33 as shown in FIGS. 2 and 5, for example, and a slot 41 is formed between the portions 34 and 36. An opening 39 extends from the top of the member 31 downwardly where it becomes a larger opening 50 as shown, for example, in FIG. 3. All portions of the line 12 can be passed through the slot 41 except those portions of the line where the tapered diameter increasers 21, 22, 23, 24 and 26 are located. The opening 39 at the top of the bracket 31 is too small for the line expanders 21, 22, 23, 24 and 26 to pass through, but the opening 50 is large enough to allow the line expanders to pass therein so as to lock the line to the bracket.

FIGS. 6-11 illustrate a modification of the bracket which is identified as bracket 60 which is attached to the railing 33 with a double-sided peel-off adhesive 68. The bracket 60 has a back flange 61 against which the adhesive 68 can be placed and the second side of the adhesive 68 is attached to the railing 33 as illustrated in FIG. 11. The bracket 60 has portions 62 and 63 between which is formed a slot 64 through which the line 12 can be inserted. A smaller opening 66 is formed in the upper portion of the bracket 60 to communicate with the slot 64 and tapers to a larger portion 67 at the bottom of the bracket 60.

In use, after the first fish 16 has been attached to the stringer 12, the stringer is moved through the slot 41 with the bracket 31 or through the slot 64 with the bracket 60 and the line 12 is pulled upwardly until the line expander 23, for example, as illustrated in FIG. 11 moves into the opening and is stopped by the upper smaller end of the opening 66 which prevents the stringer from being pulled further up through the bracket 60 as illustrated in FIG. 11, for example or, alternatively, the bracket 31 illustrated in FIG. 1.

When additional fish are to be added to the stringer, the line 12 is removed from the brackets 31 or 60 by pulling down on the line on the inside of the boat so that the line enlargers 21 or 22 or 23 or 24 or 26 move out of the opening 10 and/or 67 and the line can then be removed from the bracket 31 or 60 by pulling outwardly on the line so that it moves through the slots 41 or 64. Then the second fish can be strung on the line while leaving the first fish 16 in the water by passing the sharp point 18 of the member 17 through the mouth and gills of the second fish after which the fish can then be slid down into the water adjacent the first fish and then the stringer can be attached to the boat leaving the fish in the water by moving the line 12 through the slot 41 or 64 and pulling up on the line so that the line enlarger 21, 22, 23, 24, 26 is again locked into the bracket 31 or 60.

The increased diameter of the cord or line stops at the notch or socket which is provided. The slot 41 and 64 will be slightly smaller than the diameter of the stringer cord or line 12 so that some small amount of force is required to slip the line into and out of the notch. This retains the line in the notch during casual movement of the stringer or boat.

It is to be realized that although line diameter increasing members 21, 22, 23, 24 and 26 are shown, that one or more knots could be formed in the line by tieing them so as to provide the function of the enlargers 21, 22, 23, 24 and 26.

It is to be realized that the present stringer allows additional fish to be added to the stringer without removing the fish which have previously been caught from the water.

Also, the stringer of the present invention prevents the stringer and fish from being lost in that when a fish is caught, it can be placed on the stringer before the stringer is removed from the bracket 31 or 60 after which the stringer can be loosened from the bracket by applying a slight jerk to the stringer after which the fish can then slide down the line into the water and the stringer can then be replaced in the bracket retaining notch so that the enlarged diameter portion rests against the bracket and is held there by the weight of the fish in the water.

Although the invention has been described with respect to preferred embodiments, it is not to be so limited as changes and modifications may be made therein which are within the full intended scope as defined by the appended claims.

I claim as my invention:

1. A fish stringer which can be attached to a holder comprising, a flexible line, a fish holding means attached to one end of said flexible line and a sharp point attached to the other end of said flexible line, an enlarged portion formed in said flexible line between said one end and said other end, and a bracket that can be attached to said holder and formed with a slot into which said flexible line can be placed such that the enlarged portion cannot be moved through said bracket, wherein said flexible line is a hollow line and said enlarged portion is formed by inserting a pellet-shaped member into said flexible line, wherein said flexible line is made of plastic, and wherein said slot in said bracket allows said line to pass therein and an opening formed in said bracket which mates with said slot which has a first portion into which said enlarged portion can be received and has a second portion through which said enlarged portion cannot pass.

2. A fish stringer according to claim 1 wherein said bracket is attached to said holder with a layer of double adhesive tape.

3. A fish stringer according to claim 1 wherein said bracket is attached to said holder by screws.

* * * * *